Sept. 14, 1948.　　　　A. H. NAEF　　　　2,449,313
GROUND CONNECTING DEVICE

Filed Jan. 11, 1946　　　　　　　　　　　　2 Sheets-Sheet 1

ALFRED H NAEF
　　INVENTOR.

BY Rob Meyer
　　attorney

Sept. 14, 1948.  A. H. NAEF  2,449,313
GROUND CONNECTING DEVICE
Filed Jan. 11, 1946  2 Sheets-Sheet 2
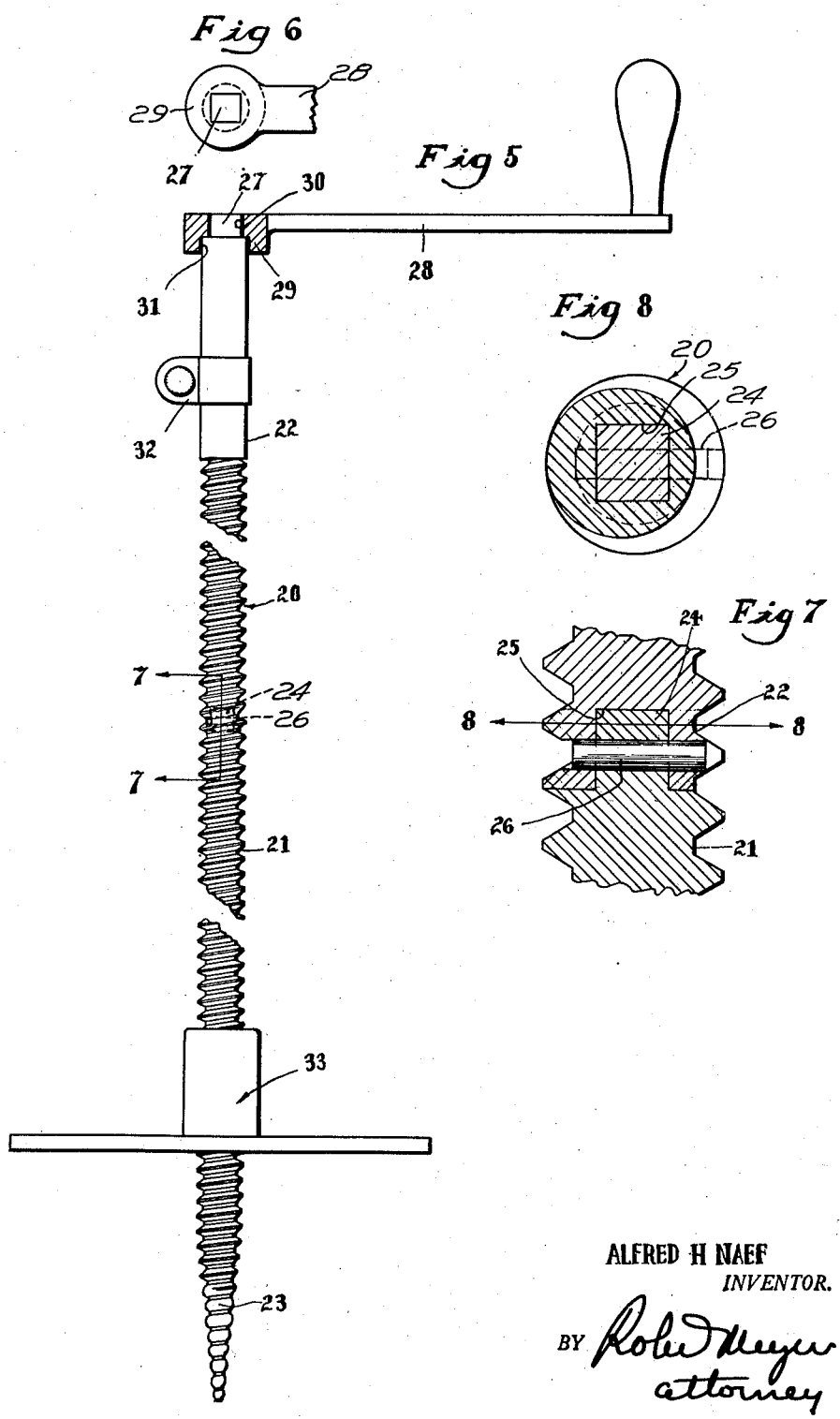
ALFRED H NAEF
INVENTOR.
BY Robert Meyer
attorney Patented Sept. 14, 1948

2,449,313

UNITED STATES PATENT OFFICE 2,449,313

GROUND CONNECTING DEVICE

Alfred H. Naef, Chatham, N. J., assignor to The Daven Company, Newark, N. J., a corporation of New Jersey Application January 11, 1946, Serial No. 640,612

1 Claim. (Cl. 174—6)

This invention relates to ground connections or ground connecting devices for use in connection with radio, telephone, telegraph and other electrical and electronic equipment requiring an electrical ground connection.

An object of the invention is to provide a relatively simple device, carrying a binding post to which an electrical conduit wire may be connected, which device may be forced into hard ground to form a firm conductive contact without the use of a mallet, hammer, or other like device.

Another object of the present invention is to provide a ground connection device as specified which embodies a threaded rod which may be screwed or threaded into the ground and which has associated therewith a footplate by means of which the full weight of the operator's body may be applied to the rod while screwing it into the ground, and whereby the operator may, by a springing action on the footplate, use his body, in effect, as a "pile driver" and thus increase the impact forces a considerable amount over the dead weight of his body, thereby facilitating the insertion of the rod in hard or rocky terrain.

Another object of the invention is to provide a ground connection device as specified which may, owing to its construction, be installed noiselessly and without shocking the terrain, and one which will secure intimate contact with the earth, thereby reducing the electrical resistance of the ground contact a very material amount over that provided by an equivalent mallet-driven plain or smooth round rod.

A further object of the invention is to provide a ground connection device or rod which can be easily removed from the ground by unscrewing, thereby materially reducing the labor required to remove the rod in relation to that required to remove a mallet driven rod.

A still further object of the invention is to so construct the internal threads in the sleeve so that in the event the edge portions of the threads upon the rod become distorted or mutilated by screwing into hard ground, rock. or the like, the threading action through the sleeve will not be materially impaired or prevented.

With these and other objects in view, as may appear from the accompanying specification, the invention consists of various features of construction and combination of parts, which will be first described in connection with the accompanying drawings, showing a ground connecting device of a preferred form embodying the invention, and the features forming the invention will be specifically pointed out in the claim.

In the drawings:

Figure 5 is a view partly in elevation and partly in section of a modified form of the ground connection device;

Figure 6 is a fragmentary top plan of the device;

Figure 7 is a longitudinal section taken on the line 7—7 of Figure 5; and

Figure 8 is a cross-section taken on the line 8—8 of Figure 7.

Figure 1:
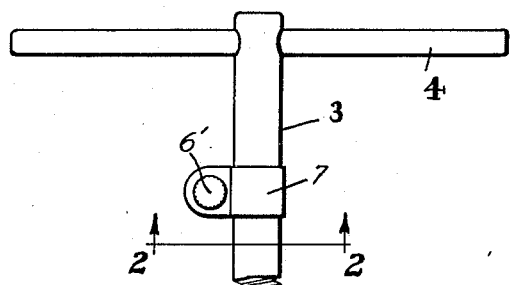
Figure 1 is a view partly in side elevation and partly in section of the improved ground connecting device.
Figure 2:
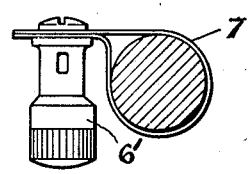
Figure 2 is a cross-section taken on the line 2—2 of Figure 1.

Referring more particularly to the drawings, the improved ground connecting device comprises a rod 1 constructed of any suitable material to provide an electrical ground connection, and it has its lower or insertion end 2 tapering substantially to a sharp point while its upper or operating end 3 has a handle 4 of any approved construction attached thereto. The main body of the rod 1 is screw threaded, as clearly shown in Figure 1 of the drawings, and the threads extend entirely to the point of the pointed insertion end 2 of the rod. The threads near the pointed end of the tapered portion 2 of the rod are slightly distorted, having their outer surfaces rounded, as shown at 5, instead of being in true screw thread form, so as to facilitate their insertion into the ground—and particularly hard ground. These distorted threads or spiral alternate grooves and ridges 5 gradually merge into the standard thread construction 6 which is provided on the major portion of the rod 1. A binding post 6' of usual approved construction is detachably connected to the upper smooth end of the rod 3 by means of a binding strap 7.

A pressure member is provided for facilitating the screwing of the rod 1 into the ground, and this pressure member comprises a sleeve 8 which is internally screw threaded as shown at 9 to receive the threads 6 of the rod 1. The sleeve 8 has a pair of laterally extending pressure plates 10 formed thereon on which the operator places his feet when threading the rod 1 into the ground.

Figure 3:
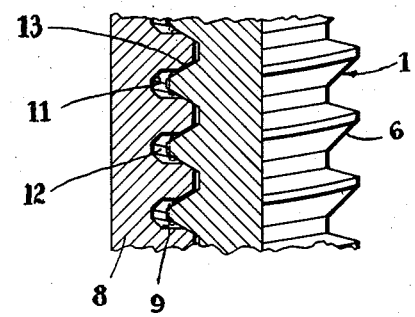
Figure 3 is an enlarged view, partly in section and partly in elevation showing the construction of the internal threads in the pressure sleeve.
Figure 4:
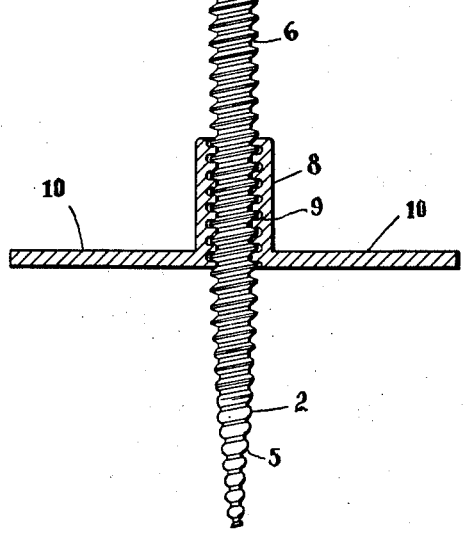
Figure 4 is a fragmentary side elevation of the pressure sleeve.
Figure 4:
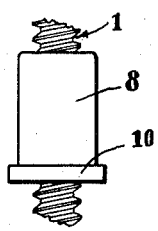

The grooves 11 of the internal threads 9 formed in the sleeve 8 are peculiarly formed so as to permit threading of the rod 1 through the sleeve in the event the perimetrical portions of the threads 6 become distorted by threading in hard ground or rock. This construction is clearly shown in Figure 3 of the drawings. The outermost portions 12 of the grooves 11 are enlarged laterally so as to be of greater width and depth than the size of the threads 6, while the inner portions of the side walls of the grooves are shaped, as clearly shown at 13, to properly fit the tapered sides of the threads 6 to provide proper threading connection between the rod 1 and the sleeve 8.

In Figures 5 to 8 inclusive, a modified construction of the ground connection rod is shown in which the rod 20 is constructed of a plurality of detachably connected sections 21 and 22. The section 21 has its end tapered to a point, as shown at 23, the same as the rod 1 has its insertion or lower end 2 tapered. This tapered end 23 is threaded in the same manner as the tapered end 2.

The upper end of the rod section 21 has a square coupling extension 24 formed thereon which fits into a square coupling recess 25 formed in the lower end of the upper section 22 of the rod. A pin 26 extends diametrically through the lower end of the section 22 and through the coupling extension 24 for securely connecting the sections 21 and 22. It is understood that the rod 26 has a tight driving fit so that the sections 21 and 22 will be held firmly connected, and also so that it may be driven out of the connecting ends of the rods to permit their disconnection.

The upper-most end of the section 22 has a square handle-receiving end 27 formed thereon which is the same size and shape as the coupling extension 24 formed on the upper end of the rod section 21. A handle 28 which has a head 29 formed thereon is mounted upon the upper end of the rod section 22. The head 29 is provided with a square recess 30 to receive the square end 27 and is counterbored, as is shown at 31, to receive the upper end of the rod 22. A binding post 32 of any approved construction is detachably attached to the rod section 22 and it may be attached to the rod section 21 below the coupling extension 24, if the section 21 is attached independently of the section 22. Square recesses 30 of the handle 28 will fit snugly over the coupling extension 24 so that the section 21 may be attached independently of the section 22 if desired. The threaded portion of the rod section 21 has a pressure member 33 mounted thereon which is identical with the pressure member 8.

It has been found that when driving the screw rod in very hard ground, the principal force to be overcome by the operator is friction of the earth against the screw thread caused by the great pressure of the surrounding earth. By making a considerable portion of the length of the main body thread of slightly less diameter than that of the maximum diameter near the point, the thread friction can be greatly relieved. This can be done without materially increasing the electrical resistance. For instance, in the case of a ¾" diameter screw rod 24" long, it has been found that by turning down slightly all that portion of the thread beyond a point four inches from the apex of the rod to a crest diameter of .710"—a decrease of only 0.40—the screw friction and energy required to drive the rod is thereby decreased as much as 300% without materially increasing the electrical resistance of the ground contact.

It will be understood that the invention is not to be limited to the specific construction or arrangement of parts shown, but that they may be widely modified within the invention defined by the claim.

What is claimed is:

In a ground connection device for radio apparatus or the like, a rod composed of a plurality of detachably connected sections, said sections having spiral threads on their outer surfaces, one of the said sections having one end tapered to a point and a coupling member formed upon its other end, another section having a coupling member on one of its ends for cooperation with the coupling member on the pointed section and having a handle coupling member on its other end; an operating handle having a coupling head thereon for operative engagement with the handle coupling member on the rod section, the coupling member on said pointed section being shaped to receive and operatively connect to the handle-carried coupling head whereby the pointed section may be used independently of the other section of the rod, a pressure plate carried by said rod, said pressure plate including an internally threaded sleeve for receiving the rod carried spiral threads, and laterally extending foot plates on said sleeve.

ALFRED H. NAEF.

REFERENCES CITED

The following references are of record in the file of this patent:

UNITED STATES PATENTS

| Number | Name | Date |
|---|---|---|
| 319,247 | Harvey | June 2, 1885 |
| 905,735 | Miller | Dec. 1, 1908 |
| 968,471 | Hardsocg | Aug. 23, 1910 |
| 1,756,641 | Hamilton | Apr. 29, 1930 |
| 1,988,926 | Thomson | June 22, 1935 |
| 2,065,184 | Heinrich | Dec. 22, 1936 |